United States Patent [19]

Terzian

[11] Patent Number: 4,604,726

[45] Date of Patent: Aug. 5, 1986

[54] SORTING APPARATUS

[75] Inventor: John Terzian, Winchester, Mass.

[73] Assignee: Raytheon Company, Lexington, Mass.

[21] Appl. No.: 485,809

[22] Filed: Apr. 18, 1983

[51] Int. Cl.⁴ ............................................. G06F 7/24
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,931,612 | 1/1976 | Stevens et al. | 364/900 |
| 4,030,077 | 6/1977 | Florence et al. | 364/900 |
| 4,410,960 | 10/1983 | Kasuya | 364/900 |

Primary Examiner—Gareth D. Shaw
Assistant Examiner—Jonathan C. Fairbanks
Attorney, Agent, or Firm—Philip J. McFarland; Richard M. Sharkansky

[57] ABSTRACT

An improved apparatus for forming an ordered sequence of n digital numbers from a randomly arranged set of n digital numbers is shown to be made up of: (a) n registers, each initially holding a different one of the randomly arranged set of n digital numbers; (b) a digital comparator for each adjacent pair of registers to determine whether or not the digital numbers in each adjacent pair of registers are in the ordered sequence and to interchange the digital numbers in any adjacent pair of registers whenever such numbers are not in the ordered sequence; and (c) a switching arrangement, operative in response to each successive one of $(2n-1)$ clock pulses, alternately to switch each digital comparator from the associated adjacent pair of registers to a different selected pair of registers whereby the digital numbers may be shifted through the n registers as required to form the ordered sequence.

3 Claims, 3 Drawing Figures

SORTING APPARATUS

BACKGROUND OF THE INVENTION

This invention pertains generally to digital data processing and to digital signal processing, and particularly to apparatus for sorting digital words at a high speed.

It is known in the art that the process of arranging digital numbers into an ordered sequence of ascending or descending values, i.e. sorting digital numbers, may be performed by controlling a digital processor by appropriate software. However, known sorting algorithms tend to be quite time consuming because the numbers to be sorted must first be stored in memory and then repeated comparisons and rearrangements of pairs of such stored numbers must be carried out in the arithmetic section of a processor to accomplish the desired sorting. Any such time expended in a sorting operation reduces computer throughput and increases processing cost. A reduction in computer throughput in turn makes it impractical in some real time signal processing applications.

SUMMARY OF THE INVENTION

With the foregoing background of the invention in mind, it is a primary object of this invention to provide apparatus capable of sorting digital numbers at a high speed.

It is another object of this invention to provide apparatus wherein contiguous blocks of data may be continuously sorted, with no gap between data blocks.

It is yet another object of this invention to provide apparatus for sorting digital numbers, such apparatus having an internal delay of $(2n-1)$ clock pulses, where n is the number of digital numbers being sorted.

The foregoing and other objects of this invention are attained generally by providing a digital sorter for sorting n digital numbers comprising $(2n-1)$ registers, a plurality of transfer circuits to control the movement of digital numbers between the registers, and to determine, at each clock pulse, the registers to be used in comparator circuits disposed between pairs of registers to effect sorting between actuated pairs of adjacent registers.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENT

Figure 1:
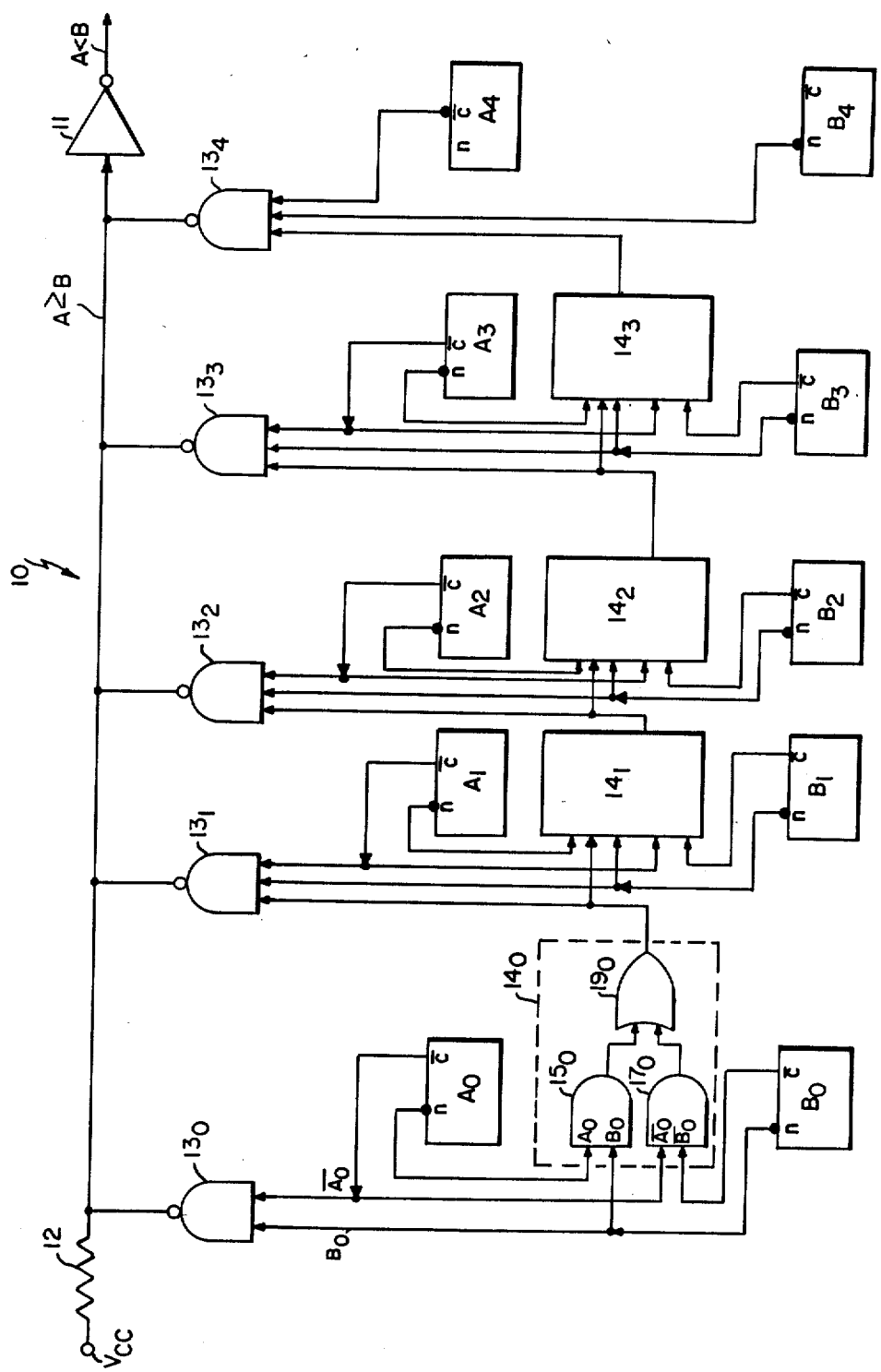
FIG. 1 is a simplified block diagram of a comparator circuit for determining whether or not the contents of a first register are less than the contents of a second register, such a comparator circuit being a basic building block of this invention.

Referring now to FIG. 1, a comparator circuit 10 designed to determine whether or not a digital number in a register A is less than a word contained in a second register is illustrated. The registers A and B are shown to be 5 bit devices ($A_0$ through $A_4$ and $B_0$ through $B_4$) although a larger or smaller number of bits could just as well be utilized. In operation, starting with the most significant bits (MSB's) in $A_0$ and $B_0$, each bit of the 5 bits stored in the registers A and B are sequentially compared in the comparator circuit 10. Here, if the digital number in register A is less than the digital number contained in register B, an output signal of an inverter 11 will be a logic 1. Otherwise, that output signal will be a logic level 0. To effect the desired operation a control voltage, $V_{cc}$, is shown to be applied through a resistor 12 to the inverter 11 to force the output of the inverter to a logic 0 level as long as the output signal from each one of a NAND gate $13_0$ and NAND gate matrices $13_1, \ldots 13_4$ remains at a logic level 1.

The input signals to the NAND gate $13_0$ are the MSB, $B_0$ from the normal output terminal n of the B register and the inverted MSB, $\overline{A}_0$, from the complementary output terminal, c, of the A register. If $B_0$ and $\overline{A}_0$ input signals are at a logic level 1 (thereby indicating that the MSB of the digital number in the B register is greater than the MSB of the digital number in the A register) the output signal from the NAND gate $13_0$ goes to a logic level 0. A COMPARE CONTINUE signal is generated in a "compare-continue" logic circuit 14 by operation of a pair of AND gates $15_0$, $17_0$ and an OR gate $19_0$ to produce a logic level 1 at the output of the OR gate $19_0$ when the MSB in $B_0$ is equal to the MSB in $A_0$. Thus, the normal outputs of $A_0$ and $B_0$ are applied as input signals to the AND gate $15_0$ and complementary outputs $\overline{A}_0$ and $\overline{B}_0$ are applied as input signals to the AND gate $17_0$. It follows then that a logic level 1 signal is applied to OR gate $19_0$ when: (a) the MSB in $A_0$ and the MSB in $B_0$ are "ones", or (b) the MSB in $A_0$ and the MSB in $B_0$ are "zeroes". Finally, if $A_o$ is greater than $B_o$, the output from the NAND gate $13_0$ is at a logic level 1 and the output from the "compare-continue" logic circuit 14 will be at a logic level 0 and the comparison is terminated.

The COMPARE CONTINUE output signal from the OR gate $19_0$ is passed to the NAND gate matrix $13_1$ and to the "compare-continue" logic circuit $14_1$ (which is basically the same as the circuit $14_0$ except that an additional input is brought to circuit $14_1$). The remaining input signals to the NAND gate $13_1$ are the next MSB, $B_1$, and the inverted $A_1$ bit. Consequently, if all of the signals to the NAND gate matrix $13_1$ are at a logic level 1, then the output of the NAND gate matrix $13_1$ will be a logic level 0, causing the output signal from the inverter 11 to be a logic level 1 and inhibiting further comparison. If, on the other hand, the output signal from the NAND gate matrix $13_1$ is not a logic level 0, then a COMPARE CONTINUE signal is generated by the circuit $14_1$ in a manner identical to that described above with reference to circuit $14_0$. The comparison process proceeds as described until either the output signal from one of the NAND gate matrices $13_2$, $13_3$ or $13_4$ is a logic level 0 or the "compare-continue" logic circuit becomes inhibited by reason of the $A_1$ bit being greater than the $B_1$ bit or the last bit of the 5 bit digital numbers stored in the A and B registers is compared.

Figure 2:
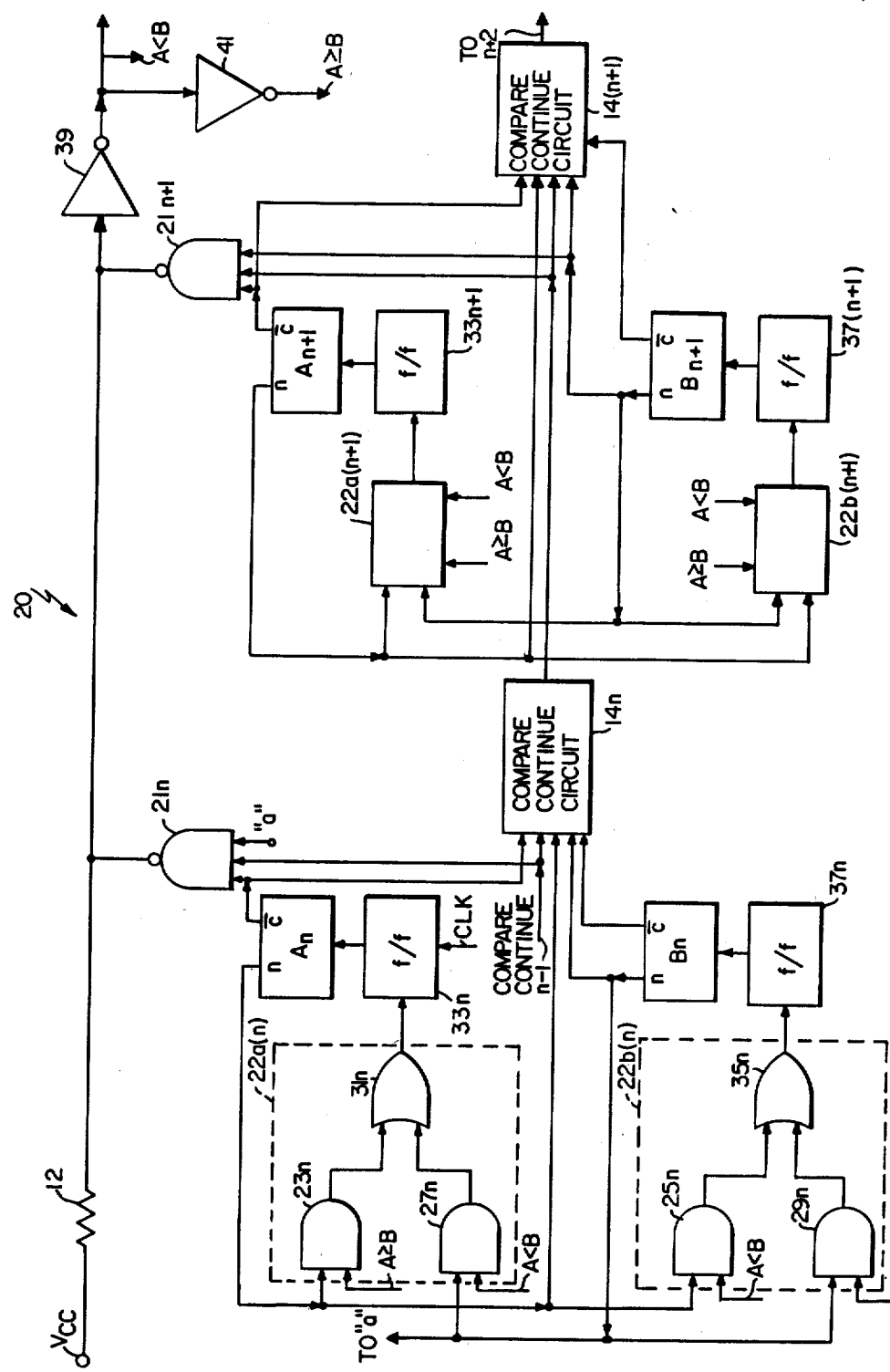
FIG. 2 is a simplified block diagram of a sorter for comparing, bit by bit, the digital numbers contained in a pair of registers, and for exchanging the contents of the two registers if the contents of register B are less than the contents of register A.

Referring now to FIG. 2, two stages of a digital sorter (including transfer gates for interchanging the digital numbers in two registers if the contents of register A are less than the contents of register B) are illustrated. It should be noted that while only two register stages are shown simply for the sake of drawing ease, in practice any size register could be utilized. The digital sorter 20 provides an output signal which, when it is a logic level 1, indicates that the contents of register A (here shown as $A_n$ and $A_{n+1}$) are less than the contents of register B (here shown as $B_n$ and $B_{n+1}$). The digital sorter 20 also provides a complementary output signal which, when it is a logic level 1, indicates that the contents of register A are either greater than or equal to the contents of register B. Once it has been determined that the contents of register A are less than the contents of register B, the data in those two registers are interchanged on the occurrence of the clock pulse.

Either one of a pair of NAND gate matrices $21_n$, $21_{n+1}$ provides a logic level 0 signal if the contents of register A are less than the contents of register B. Provided as input signals to the NAND gate matrix $21_n$ are the inverted $n^{th}$ bit from the A register, $A_n$, the COMPARE CONTINUE signal (which should be recalled is a logic level 1 when all of the preceding B stages ($B_o$ through $B_n$) equal all of their correponding preceding A stages, and so forth). All three of the inputs to the NAND gate matrix $21_n$ must be a logic level 1, thereby indicating that the $n^{th}$ bit from the B register is greater than the corresponding bit from the A register and previous stages are equal.

As mentioned hereinabove, the digital sorter 20 includes transfer gates $22_{a(n)}$, $22_{b(n)}$, $22_{a(n+1)}$, $22_{b(n+1)}$ for interchanging the digital numbers in the A and B registers if the contents of register A are less than the contents of register B. To this end, the $n^{th}$ bit, $A_n$, from the A register is provided as an input to a pair of AND gates $23_n$, $25_n$, and the $n^{th}$ bit, $B_n$, from the B register is provided as an input to a second pair of AND gates $27_n$, $29_n$. The second input signal to each one of the AND gates $23_n$, $29_n$ is the output signal from an inverter 41. When such output signal is a logic level 1 (indicating that the contents of register A are equal to or greater than the contents of register B), AND gates $23_n$, $29_n$ are enabled. The second input signal to the AND gates $25_n$, $27_n$ is the output signal from an inverter 39. When such output signal is a logic level 1 (indicating that the contents of register A are less than the contents of register B) the AND gates $25_n$, $27_n$ are enabled. The output signals from AND gates $23_n$, $27_n$ are input signals to an OR gate $31_n$ to provide an actuating signal for type D flip-flop $33_n$. In like manner, the output signals from AND GATES $25_n$, $29_n$ are input signals to an OR gate $35_n$ to provide a trigger for a type D flip-flop $37_n$.

Assuming now for the moment that the output signal from the NAND gate matrix $21_n$ is a logic level 0 (indicating that the contents of register A are less than the contents of register B), the applied control voltage, is changed with the result that a logic level 1 output is derived from the inverter 39 and a logic level 0 is derived from the inverter 41. The logic level 0 from the inverter 41 assures that the output signal from the AND gates $23_n$, $29_n$ will be a logic level 0. Similarly, the logic level 1 from the inverter 39 assures that the output signals from AND gates $25_n$, $27_n$ are, respectively, 1 $A_n$ and 1 $B_n$. Consequently, the output signals from the OR gates $35_n$, $31_n$, respectively, may be expressed as $A_n+0$ and $B_n+0$. As mentioned hereinabove, the output signal, $B_n$, from OR gate $31_n$ is provided as an actuating signal to the type D flip-flop $33_n$, while the output signal, $A_n$, from the OR gate $35_n$ is provided as an actuating signal to the type D flip-flop $37_n$. It will now be appreciated that the output signals from the type D flip-flops $33_n$, $37_n$ (after the application of a clock pulse) will be identical to the actuating signals applied to those devices prior to the clock pulse. Thus, if the contents of register A are less than the contents of register B, the just described circuitry is effective to interchange the contents of those two registers.

If, on the other hand, the output signals from neither of the NAND gate matrices $21_n$, $21_{(n+1)}$, were a logic level 0, then the output signal from the inverter 39 would be a logic level 0 and the output signal from the inverter 41 would be a logic level 1. In this situation the output signals from the OR gates $31_n$, $35_n$ would be, respectively, $A_n$ and $B_n$ and the application of a clock pulse to flip-flops $33_n$, $37_n$ would not change the contents of either the A or B registers.

Completing the digital sorter 20 are the COMPARE CONTINUE logic networks $14_n$, $14_{(n+1)}$ that are constructed in the same way as the corresponding network $14_0$ (FIG. 1). It will now be appreciated that similar circuitry will be required to process each corresponding bit stored in the A and B registers. Such circuitry required to process the $n+1^{th}$ bit stored in registers A and B is identified with the same reference numeral, but with the subscript $n+1$.

The digital sorter can be made to perform a high speed automatic sort. Thus, consider that all the registers, only two of which are shown, are numbered consecutively from zero to n. By definition, a register/comparator pair is odd or even in accordance with the lower register number (i.e., registers 4 and 5 are an even pair and registers 5 and 6 are an odd pair). If clock pulses are applied alternately to the even and odd register/comparator pairs, the n-bit word in the registers will be sorted after the application of n clock pulses.

An example of the contemplated sorting process is illustrated in TABLE 1.

TABLE 1

| REGISTER NUMBER | INITIAL SET | PULSE 1 | PULSE 2 | PULSE 3 | PULSE 4 | PULSE 5 | PULSE 6 |
|---|---|---|---|---|---|---|---|
| 0 | 1 | 2 | 2 | 4 | 4 | 6 | 6 |
| 1 | 2 | 1 | 4 | 2 | 6 | 4 | 5 |
| 2 | 3 | 4 | 1 | 6 | 2 | 5 | 4 |
| 3 | 4 | 3 | 6 | 1 | 5 | 2 | 3 |
| 4 | 5 | 6 | 3 | 5 | 1 | 3 | 2 |
| 5 | 6 | 5 | 5 | 3 | 3 | 1 | 1 |

The example presented in TABLE 1 represents the worst case of a block of digital numbers (1, 2, 3, 4, 5, 6) to be arranged in reverse order (6, 5, 4, 3, 2, 1) from that in which such numbers are initially stored in a set of registers numbered from 0 to 5. The brackets in the TABLE designate register pairs to be processed on the next clock pulse. Recalling that a register pair is "even" or "odd" in accordance with the lower register number in any pair and that the first clock pulse is applied to "even" register pairs, the brackets in the INITIAL SET column indicate that register pairs 0, 2 and 4 are to be processed on the first clock pulse. As the numbers in registers 0, 2 and 4 are less than the corresponding numbers in registers 1, 3 and 5, the numbers in each of the register pairs 0, 2 and 4 are interchanged, resulting in the sequence shown in the PULSE 1 column. On the second clock pulse the odd register pairs 1 and 2 and 3 and 4 are processed as indicated by the brackets in the PULSE 1 column. Again, as the numbers in registers 1 and 3 are less than the corresponding numbers in registers 2 and 4, the numbers in the register pairs are interchanged, resulting in the sequence shown in the PULSE 2 column. This process repeats until after the 6th clock pulse the data are rearranged in a descending ordered sequence as shown in the PULSE 6 column.

In many signal processing applications it is desirable to operate the digital sorter 20 in a pipelined fashion wherein blocks of digital numbers arrive at the input of the sorter a number at a time with no gaps between consecutive blocks. Obviously, some modifications must be made to the digital sorter 20 to support pipelined operation. These modifications will be described in a general manner before embarking on a detailed description of a pipelined sorter. Thus, for pipelined sorting of n number blocks, the sorter must contain 2 n−1 registers. Each of such registers will be m+1 bit devices with the first m bits holding the digital number to be sorted. The (m+1)$^{th}$ bit, referred to as the "tag bit", is used as a block delimiter. The tag bit of the first number to be sorted is set to a logic level 1 by logic external to the sorter. The tag bits of the remaining numbers in the block are set to a logic level 0. Assume now for the moment that i numbers have been shifted into the sorter and stored in registers zero through i−1. The first clock pulse then applied to the sorter processes the data in the even register pairs as was explained hereinabove with reference to TABLE 1. The second clock pulse applied to the sorter will shift the numbers in the original number block by one position so that that block now occupies registers 1 through i and, at the same time, the second clock pulse will enter the i+1$^{th}$ number into register 0. It should be noted that the shifting of the original number block by one register aligns the numbers in such a manner that the even register pairs then hold numbers that were originally held in the odd register pairs. In consequence, then, the even numbered comparator gates can be used again and the odd numbered comparator gates may be discarded. Further, in the interest of speed and efficiency, the operations just described as occurring in two consecutive clock pulses can, in fact, be executed with a single clock pulse. Thus, with each clock pulse the numbers in even register pairs are compared and the numbers are shifted one position (register) in either the original or reversed order, depending upon whether or not the number in the lower numbered register is less than the number in the higher numbered register.

For pipelined operation one additional factor must be considered. That is to say, sorting operations between register pairs must not occur between numbers in separate but contiguous blocks. To this end, when the tag bit of an even register is set (at a logic level 1) the word in the upper register of the pair is the first word of the subsequent block. Hence, in this case, both numbers are simply shifted one position with no consideration of the relative magnitude of the two numbers. Finally, it should be noted that the tag bits are always shifted one position with each clock pulse regardless of the attitude of the register in which it resides.

If the smaller, or even numbered, register of a register pair is designated as $R_n$ and the odd numbered register of the pair is designated as $R_{n+1}$, then the just described operation of a pipelined sorter may be summarized by the following two rules:

(A) If the tag bit of $R_n$ is set or if the contents of $R_n$ are greater than or equal to the contents of $R_{n+1}$, a clock pulse will shift the contents of both registers by one position;

(B) If, however, the tag bit of $R_n$ is a zero and the contents of register $R_n$ are less than the contents of register $R_{n+1}$, a clock pulse will transfer the contents of register $R_n$ to register $R_{n+2}$ and the contents of register $R_{n+1}$ are left unchanged;

(C) Tag bits are always shifted one position regardless of the magnitude of the register in which it resides.

TABLE 2

| REGISTER NUMBER | INITIAL SET | PIPELINED SORTER PULSE NUMBER | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| 0 | X | *6 | 5 | 4 | 3 | 2 | 1 | *9 | 4 | 8 | 4 | 7 | 2 | *6 | 5 | 7 | 3 |
| 1 | X | X | *6 | 6 | 6 | 6 | 6 | 6 | *9 | 9 | 8 | 8 | 8 | 8 | *6 | 6 | 7 |
| 2 | X | X | X | *5 | 4 | 3 | 2 | 1 | 6 | *4 | 9 | 4 | 7 | 2 | 8 | *5 | 6 |
| 3 | X | X | X | X | *5 | 5 | 5 | 5 | 5 | 6 | *4 | 9 | 9 | 9 | 9 | 9 | *5 |
| 4 | X | X | X | X | X | *4 | 3 | 2 | 1 | 5 | 6 | *4 | 4 | 7 | 2 | 8 | 9 |
| 5 | X | X | X | X | X | X | *4 | 4 | 4 | 4 | 5 | 6 | *4 | 4 | 7 | 7 | 8 |
| 6 | X | X | X | X | X | X | X | *3 | 2 | 1 | 4 | 5 | 6 | *4 | 4 | 2 | 7 |
| 7 | X | X | X | X | X | X | X | X | *3 | 3 | 3 | 4 | 5 | 6 | *4 | 4 | 4 |
| 8 | X | X | X | X | X | X | X | X | *2 | 1 | 3 | 4 | 5 | 6 | *4 | 2 |
| 9 | X | X | X | X | X | X | X | X | X | *2 | 2 | 3 | 4 | 5 | 6 | *4 |
| 10 | X | X | X | X | X | X | X | X | X | X | *1 | 2 | 3 | 4 | 5 | 6 |

TABLE 2 is presented as an example of the operation of a pipelined sorter. Within the TABLE even numbered register pairs are contained within the continuous horizontal lines. The asterisk indicates that the corresponding register tag bit is set. The initial contents of the sorter (not shown) are indicated by X's as "don't cares". Illustrated in TABLE 2 is a full sort for one six number block and partial sorts for two succeeding blocks. The first block contains the same numbers as in TABLE 1 and numbers in the first block arrive at the registers in the same sequence as presented in TABLE 1. The first six clock pulses load the first block into the sorter (not shown) and perform a partial sort as shown in TABLE 2. Clock pulses 7 through 11 complete the sort of block 1 and also load the first five numbers of block 2.

The first clock pulse loads the number 6 into register 0 and, as mentioned hereinabove, the asterisk indicates that the corresponding tag bit is set to a logic level 1. According to rule A, then, the second clock pulse will shift the contents of register 0 into register 1 and load the number 5 into register 0. On the third clock pulse the contents of registers 0 and 1 are examined and, in accordance with rule B, as the tag bit in register 0 is not set and the contents of register 0 are less than the contents of register 1, the contents of register 0 are shifted to register 2 and the contents of register 1 are left unchanged. The third clock pulse is also effective to shift the number 4 into register 0. On the fourth clock pulse the contents of registers 0 and 1 as well as registers 2 and 3 are examined. The contents of register 0 are shifted to register 2 and the contents of register 1 remain unchanged in accordance with rule B, while the contents of register 2 are shifted into register 3 according to rule A. The fourth clock pulse also shifts the number 3 into register 0. The loading and sorting process continues as described for each subsequent clock pulse. The original block, after being sorted, is read out of the sorter (not shown) beginning with the eleventh clock pulse, thereby indicating that the delay through the pipelined sorter is $2n-1$ clock pulse intervals.

Figure 3:
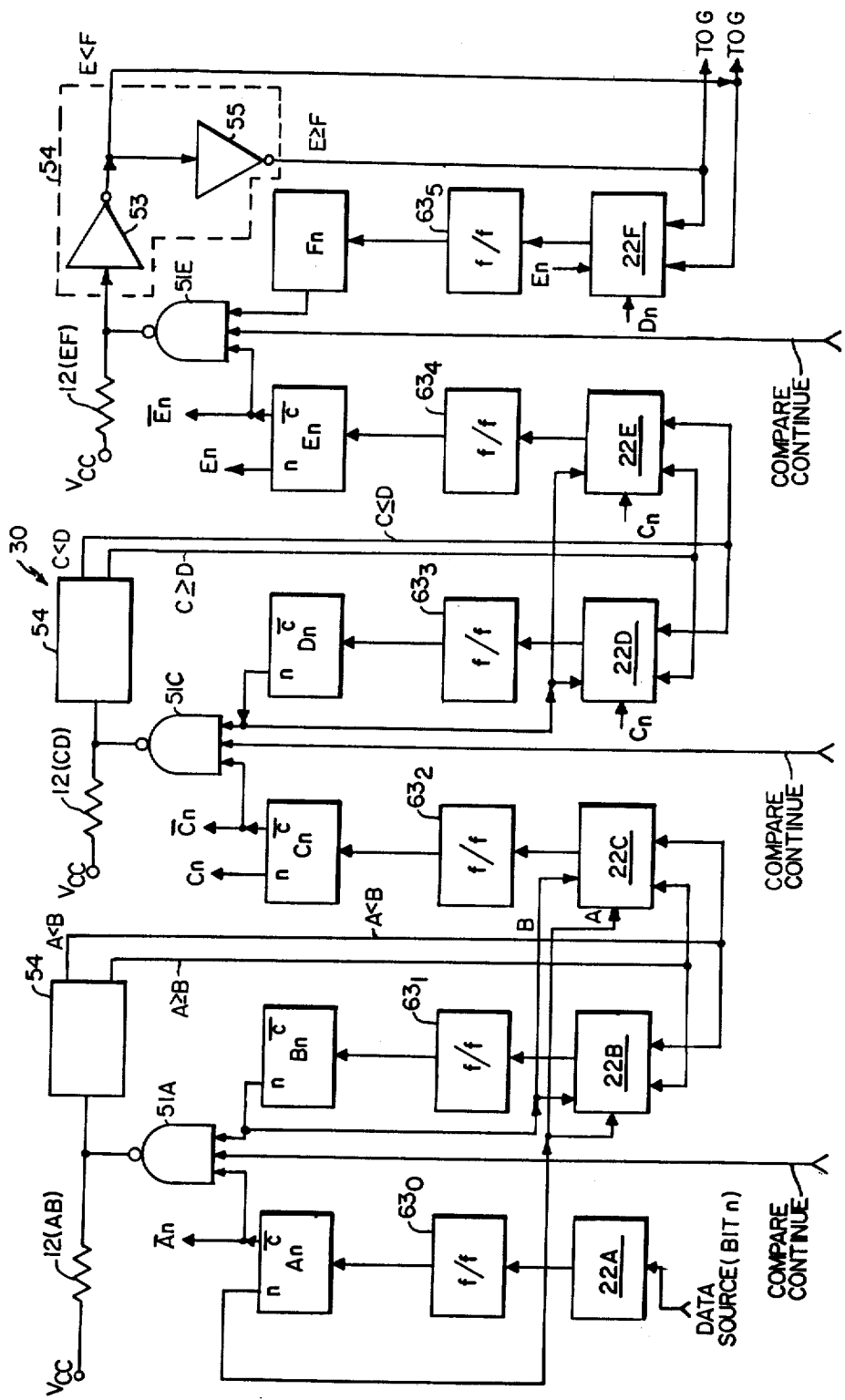
FIG. 3 is a simplified block diagram of a pipelined sorter according to this invention.

Referring now to FIG. 3, a pipelined sorter 30 according to this invention is shown to include six registers labeled $A_n$ through $F_n$. Before proceeding with a detailed description of the pipelined sorter it should be noted that, for the sake of drawing ease and clarity, the processing for only the $n^{th}$ bit of each of the registers is shown, and the requisite clock signals are not shown. Further, the requisite logic for controlling the data transfer in accordance with the status of the tag bit is not shown. It should, however, be appreciated that the requisite logic to support the tag bit function could be provided by conventional shift register logic as is well known and widely practiced in the art. Thus, to handle the situation where the tag bit is set, such conventional shift register logic would be controlled by the clock signals directly without consideration of the $A \geq B$ signal or the $A < B$ signal.

Within the pipelined sorter 30 registers A, C and E are even-numbered registers. At the outset it should be noted that the comparator circuits (not numbered) required to develop the COMPARE CONTINUE signal accept inputs only from the even-numbered register pairs, as A and B, C and D, E and F. This is in accordance with the manner in which the data is clocked through the pipelined sorter 30 as was explained hereinabove. The NAND gates $51_A$, $51_C$, $51_E$, which also form part of the comparator circuits, are required between the register pairs. The NAND gates $51_A$, $51_C$ and $51_E$ are effective, in conjunction with inverters 53, 55, contained in each box marked 54 to develop the control signals as indicated in a manner described in detail hereinabove with reference to FIG. 2.

The noninverted $n^{th}$ bit, $A_n$, from the A register is provided as an input to transfer gates 22B and 22C along with the $A \geq B$ and $A < B$ control signals and the noninverted $n^{th}$ bit, $B_n$, from the B register. Thus, if the contents of the A register are greater than or equal to the contents of the B register, transfer gate 22B is effective to transfer the $n_{th}$ bit from the A register to the B register and gate 22C is effective to transfer the $n^{th}$ bit from the B register to the C register. If, on the other hand, the contents of the A register are less than the contents of the B register, transfer gate 22B is effective to reinsert the $n^{th}$ bit from the B register into the nth bit of the B register and transfer gate 22C is effective to transfer the $n^{th}$ bit from the A register to the nth bit of the C register. The data transfer between the remaining registers is identical to that just described for the A, B and C registers.

Having described a preferred embodiment of this invention, it will be apparent to one of skill in the art that many changes may be made in the illustrated embodiment without departing from its inventive concepts. Thus, for example, a plurality of pipelined sorters could be serially connected together to handle longer blocks of data than could be handled by a single device. Further, an analog version of the pipelined sorter could be formed by replacing the digital registers with charge coupled device (CCD) shift registers, replacing the digital comparators with differential amplifiers (analog comparators) and replacing the transfer gates with their analog equivalents. It is felt, therefore, that this invention should not be restricted to its disclosed embodiment, but rather should be limited only by the spirit and scope of the appended claims.

What is claimed is:

1. In a digital computer wherein a randomly arranged set of n digital numbers is to be converted to a set of n digital numbers, where n is greater than two, in and ordered sequence after $(2n-1)$ clock pulses, the improvement comprising:
    (a) n registers for storing n digital numbers, the digital numbers initially stored in such registers being randomly arranged;
    (b) comparator means, switchably disposed between adjacent first pairs of registers upon the occurrence of odd numbered ones of the $(2n-1)$ clock pulses, for testing the digital numbers initially stored in each such first pair of registers to determine whether or not the digital numbers stored in each first pair are in the ordered sequence and to produce first control signals indicative of the result of comparison of the digital numbers;
    (c) transfer means, responsive to first control signals indicating that the digital numbers stored in any first pair of registers are not in the ordered sequence, for then interchanging the digital numbers in any such first pair; and
    (d) means, responsive upon occurrence of even numbered ones of the $(2n-1)$ clock pulses, for switching each comparator means to a second pair of adjacent registers, each one of such second pair including one of the registers in a corresponding first pair and not the first or the last ones of the registers, to produce second control signals for the transfer means whereby, after the occurrence of, at the most, $(2n-1)$ clock pulses, the digital numbers stored in the registers are in the ordered sequence.

2. The improvement as in claim 1 wherein each one of the comparator means comprises a NAND gate matrix for producing control signals only when the digital number in the first one of each pair of registers is less than the digital number in the second one of each such pair.

3. The improvement as in claim 2 wherein each one of the transfer means comprises:
    (a) an AND gate matrix, responsive to the control signals out of the NAND gate matrix and to the digital numbers in each one of the corresponding pair of registers, for producing a corresponding trigger signal; and
    (b) a type D flip-flop, responsive to the corresponding trigger signal, for setting, or resetting, the bits in the corresponding registers.

* * * * *